United States Patent [19]
Wardle et al.

[11] Patent Number: 6,100,375
[45] Date of Patent: Aug. 8, 2000

[54] METHODS FOR CONTROLLED POLYMERIZATION OF ENERGETIC CYCLIC ETHERS USING ALKYLATING SALTS

[75] Inventors: Robert B. Wardle, Logan; W. Wayne Edwards, Tremonton, both of Utah

[73] Assignee: Cordant Technologies, Inc., Salt Lake City, Utah

[21] Appl. No.: 08/233,219

[22] Filed: Apr. 26, 1994

Related U.S. Application Data

[63] Continuation of application No. 07/880,536, May 8, 1992, abandoned.

[51] Int. Cl.$^7$ .............................. C08F 6/00; C08G 59/00
[52] U.S. Cl. .......................... 528/486; 528/487; 528/490; 528/495; 528/403; 528/408
[58] Field of Search ................................. 528/403, 408, 528/486, 487, 490, 495

[56] References Cited

U.S. PATENT DOCUMENTS 4,988,797  1/1991  Wardle et al. ........................ 528/408
5,124,417  6/1992  Farooq ..................................... 526/90

*Primary Examiner*—James J. Seidleck
*Attorney, Agent, or Firm*—Pillsbury Madison & Sutro LLP

[57] ABSTRACT

Energetic polymers and methods for their synthesis are provided. The polymers are preferably produced from cyclic ether monomers having 4 or 5 member rings. The cyclic ether monomers preferably include energetic functional groups such that a polymer formed from the monomer is itself energetic. Polymerization is catalyzed by a combination of alkylating salt and alcohol. The preferred salts are triethoxonium salts with anions such as hexafluorophosphate, hexachloroantimonate, and tetrafluoroborate. It is found that by employing the combination of selected triethoxonium salts and selected alcohols that it is possible to produce an energetic polymer with predetermined functionality and molecular weight. The salt is found to scavenge water in the reaction mixture, thus increasing control over the functionality of the final product. The salt-alcohol combination also rapidly initiates polymerization and allows higher molecular weights to be achieved. This is particularly important in that one limitation previously experienced in polymerization of the types of monomers used in this invention was an inability to achieve rapid and complete polymerization.

10 Claims, No Drawings

METHODS FOR CONTROLLED POLYMERIZATION OF ENERGETIC CYCLIC ETHERS USING ALKYLATING SALTS

This application is a continuation of U.S. application Ser. No. 07/880,536, filed May 8, 1992, now abandoned for METHODS FOR CONTROLLED POLYMERIZATION OF ENERGETIC CYCLIC ETHERS USING ALKYLATING SALTS AND COMPOSITIONS FORMED THEREBY.

BACKGROUND

1. The Field of the Invention

The present invention is related to energetic polymer compositions and methods for their polymerization. More particularly, the present invention is related to the polymerization of cyclic ether monomers using selected alkylating salts together with a selected alcohol as the polymerization catalyst.

2. Technical Background

It has long been desired to find efficient and effective methods of polymerization of cyclic ethers. Ring-opening polymerization of cyclic ethers is well established. For example, the polymerization of cyclic ethers with an alcohol initiator and an acid catalyst is described in U.S. Pat. No. 4,988,797. Synthesis of ABA triblock polymers and $A_nB$ star polymers from cyclic ethers is described in U.S. Pat. No. 4,952,644. In addition, the synthesis of tetrafunctional polyethers using certain tetraols is described in U.S. Pat. No. 5,098,277.

Polymers of cyclic ethers are commercially important and have been used as engineering plastics, as well as in the making of polyurethanes. Thus, effective methods of polymerization are of significant interest and of significant importance.

It has been found that certain polymers of cyclic ethers are particularly adaptable for use as binders for various compositions. Binders are generally materials which provide consistency to a composition and which bind together all of the constituent elements of a composition. Such polymerized cyclic ether formulations are particularly adaptable for use as binders in the formation of explosives and propellants. Such binders are able to carry and spatially immobilize large amounts of solid particulates, such as fuel particulates and oxidizer particulates.

One area of concern has been control of the functionality of the polymer formed from cyclic ether monomers. The functionality of the polymer is an important determinant of the polymer's chemical and physical properties. In addition, if it is desired to produce block copolymers it is clearly necessary to control the functionality of the polymer intermediates in order to control the nature of the copolymer which results.

Generally, the hydroxyl functionality of a polymer corresponds to the hydroxyl functionality of the alcohol employed in the synthesis of the polymer. Thus, if the alcohol is a diol, such as butanediol, the polyether is expected to have a hydroxyl functionality of about 2. If the alcohol is a triol, the polymer is expected to have a functionality of about 3.

Predictability of functionality is not precise in existing systems, however, because side reactions or incomplete initiation from all hydroxyl groups frequently results in a polymer which varies from the functionality of the alcohol precursor. Variation in functionality of the polymer clearly causes problems in many contexts. For example, in the use of the polymer in the formation of block copolymers variation in functionality will result in less than ideal block copolymers. Thus, it would be a significant advancement to provide methods for synthesis of polymers which would allow more precise control of the functionality.

As mentioned above, cyclic ether polymers are of interest as binders in certain types of chemical formulations. One area of significant interest is the use of cyclic ether polymers as binders for propellants and explosives. When conventional polymers are used as binders for propellants and explosives, it has been found that the binder does not contribute significantly to the energy output of the overall formulation. While the binder is consumed by the burning of the propellant or explosive, the energy added is relatively small. Accordingly, it would be beneficial to provide a binder which was also "energetic." In such a formulation, the binder itself would contribute significant energy when the energetic formulation is burned.

In order to attempt to prepare an energetic binder, it would be useful to employ monomers which include energetic functional groups. In the case of cyclic ethers, it would be useful to attach energetic functional groups to the cyclic ether molecule in order to form an energetic binder.

It is observed, however, that the addition of certain energetic functional groups to the cyclic ether monomer results in a significant slowing of the conventional polymerization reaction. Thus, polymerization efficiency is reduced. The polymerization reaction takes a longer period of time and the resulting polymer generally has a lower molecular weight than would otherwise be expected or desired.

Thus, it would be a significant advancement in the art to provide methods and compositions which overcame some of the problems otherwise encountered in the polymerization of cyclic ethers generally, and in the polymerization of cyclic ethers having attached energetic functional groups in particular. It would be an advancement in the art to provide methods for polymerizing cyclic ethers which were quicker and more efficient than known methods. It would be a related advancement in the art to provide methods for polymerizing cyclic ethers which would allow polymerization of energetic cyclic ethers. It would be a further advancement in the art to provide methods of polymerizing cyclic ethers which resulted in precise control of the functionality of the resulting polymer. It would be an advancement in the art to provide methods of polymerizing cyclic ethers which also result in precise control of molecular weight.

Such methods and compositions are disclosed and claimed herein.

BRIEF SUMMARY AND OBJECTS OF THE INVENTION

The present invention relates to improved methods for the synthesis of energetic polymers based upon cyclic ether monomers. The present invention is particularly useful in the polymerization of cyclic ether monomers having 4 or 5 member rings. These monomers include oxetane, substituted oxetanes, tetrahydrofuran, and substituted tetrahydrofurans. The polymers resulting from such polymerization reactions are particularly useful as binders in the preparation of explosive and propellant formulations. Indeed, unlike conventional binders, the polymers produced according to the present invention provide substantial energy output upon the burning of the propellant or explosive composition.

The methods of the present invention includes the use of a set of alkylating salts and an alcohol to function as an initiation system for the polymerization reaction. The preferred method includes the use of triethoxonium salts with weakly coordinating anions as a portion of the catalyst system. Typical triethoxonium salts which are found useful in the present invention include triethoxonium hexafluorophosphate, triethoxonium hexachloroantimonate, and triethoxonium tetrafluoroborate.

The alkylating salts mentioned above are added in catalytic amounts, generally less than 20 mole percent (mole ratio of 0.20), relative to an alcohol co-catalyst. The present invention teaches the addition of the salt and the alcohol to a non-polar solvent. One preferred solvent comprises dichloromethane. Another acceptable solvent comprises chloroform. The cyclic ether monomer is then added to the mixture of salt, alcohol, and solvent, and rapid polymerization of the monomer is observed. The resulting polymer is of a predictable molecular weight based upon the relative amounts of alkylating salt, alcohol, and monomer.

The salt and co-catalyst system is novel in the art of 4 and 5 member ring cyclic ether polymerization. It is observed that the alkylating salts described herein are dramatically more effective in preparing high molecular weight polymers than are known catalyst systems. This is of particular importance because it has been observed that the energetic functional groups attached to the cyclic ether monomers can otherwise impede the polymerization process.

The present invention is particularly useful in preparing polymers of known functionality. This is especially the case when it is desired to produce a polymer which is essentially mono-functional. Importantly, it is found that the salt is more reactive toward water than any alcohol. The initial reaction of the salt, therefore, is to scavenge water which may exist in the reaction system. The existence of water in the system results in a lack of control over the functionality and molecular weight of the polymer end product. The salt-water reaction results in one molecule each of diethyl ether, ethanol, and the conjugate acid of the non-coordinating anion.

The strong acid produced by the salt may be an important species in the initiation of the reaction. It is believed that any of the salt which does not react with water will react with the alcohol co-initiator to form acid and two inert ether molecules. Since ethanol formed by the reaction with water is a poor polymerization initiator, this further insures a polymerization which is free of undesirable initiating species, thereby providing excellent control of the resulting functionality of the polymer.

Using this method, materials having essentially 1.0 functionality are prepared. The polymer materials produced also have higher molecular weights than those achieved with conventional methods. It is also clear that the present invention is useful for sequential polymerizations.

Thus, it is a primary object of the present invention to provide improved methods for polymerizing cyclic ethers.

More particularly, it is an object of the present invention to provide methods for polymerization of cyclic ethers having 4 or 5 member rings.

It is a related object of the present invention to provide methods for polymerization of cyclic ethers which include the use of an alkylating salt as a catalyst.

It is another object of the present invention to provide methods for the polymerization of cyclic ethers in which an alkylating salt and an alcohol act as co-catalysts.

It is a further object of the invention to provide methods for polymerizing cyclic ethers which result in polymers having controlled functionality and controlled high molecular weights.

It is another object of the present invention to provide polymers of cyclic ethers having the characteristics described above.

These and other objects and advantages of the invention will become apparent upon reading the following detailed description and appended claims.

DETAILED DESCRIPTION OF THE PREFERRED EMBODIMENTS

The present invention is related to the controlled, but effective, polymerization of cyclic ethers. It will be appreciated that it is known to polymerize certain types of cyclic ethers, either individually, or as a portion of a block co-polymer. The present invention, however, provides improvements in the synthesis of polymers from energetic cyclic ethers, while providing control over functionality and molecular weight. In addition, higher molecular weights in range of from approximately 1,000 to approximately 50,000 are more readily obtainable.

The invention is particularly directed to polymerization of cyclic ethers having 4 or 5 member rings, including oxetane, substituted oxetanes, tetrahydrofuran, and substituted tetrahydrofuran. Polymerizations in accordance with the present invention may be conducted with a single monomer species, or a mixture of monomer species. It is common, for example, to copolymerize tetrahydrofuran and a substituted oxetane. The present invention facilitates such polymerization processes.

Oxetane and tetrahydrofuran monomer units for use in producing the polymers of the present invention have the general formulae:

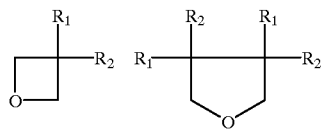

In the above formulae, $R_1$, and $R_2$ are the same or different and are generally selected from the group consisting of moieties having the formula $-(CH_2)_nX$, where n is an integer from 0 to 10, and X is selected from the group consisting of $-N3$, $-H$, $-ONO_2$, $-Cl$, $-CN$, $-Br$, and $-O(alkyl)$ (wherein alkyl is $C_1-C_{16}$, branched or unbranched, cyclic or acyclic. The number n moieties (which together define the R group) are selected in order to provide the resulting polymer with particular desired characteristics. It will be appreciated that the functional groups attached to the cyclic ether monomer play an important role in determining the energetic characteristics of the resulting polymer. Thus, certain R groups may be selected in order to provide the resulting polymer with the desired energetic characteristics.

It has been found, however, that the addition of energetic functional groups to the cyclic ether monomer may significantly slow down the polymerization reaction. Thus, using conventional methods it is found that polymers with lower than desired molecular weights are provided, or unacceptably long reaction times are required to prepare such polymers.

The present invention, conversely, provides methods which overcome this limitation. The present invention provides for polymerization in the presence of an alkylating salt. The salt generally exists in the system in catalytic amounts (less than approximately 20 mole percent relative to the alcohol co-catalyst). Preferred salts include triethoxonium salts. Representative examples of such salts include triethoxonium hexafluorophosphate, triethoxonium hexachloroantimonate, and triethoxonium tetrafluoroborate. These salts provide a highly activated catalyst which is much superior to standard lewis acids. The highly activated salt provides a significantly higher molecular weight polymer than those formed by existing processes.

The triethoxonium salts also scavenge water from the reaction mixture. It will be appreciated that the existence of water in the reaction mixture results in polymers with unpredictable functionality and reduced molecular weight using conventional methods. By use of the present invention, however, it is possible to form polymers with controlled functionalities, even functionalities of essentially 1.0.

The reaction of a typical triethoxonium salt with water in the reaction mixture is believed to be as follows:

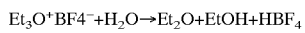

$$Et_3O^+BF4^- + H_2O \rightarrow Et_2O + EtOH + HBF_4$$

Thus, the reaction results in one molecule each of diethyl ether, ethanol, and the conjugate acid of the non-coordinating anion.

This reaction results in the scavenging of water from the mixture, and also provides for 1.0 functionality of the resulting polymer because of the production of a mono-functional alcohol. Water is known to open the ether ring in the presence of an acid catalyst, resulting in higher functionality. In addition, water in the reaction mixture results in a lower molecular weight end product.

As mentioned above, the acid produced by the reaction with water may be an initiating species of the polymerization reaction. This is true because any of the salt which does not react with water, will react with the alcohol co-catalyst, and will also form acid along with two inert ether molecules.

An alcohol is also employed as a co-catalyst of the polymerization reaction. The alcohol and the salt react to form acid initiators of the type formed by the reaction of water with the salt. A typical reaction is believed to be as follows:

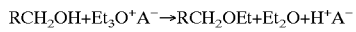

$$RCH_2OH + Et_3O^+A^- \rightarrow RCH_2OEt + Et_2O + H^+A^-$$

where A is typically a species such as $PF_6^-$, $SbF_6^-$, $BF_4^-$, and $B(C_6H_5)_4^-$. It will be noted that the same type of acid species is created by this reaction as is created by the water reaction.

The method of the present invention is easily adaptable to various types of polymer synthesis. The method can be used in the formation of homopolymers, random copolymers, and block copolymers. Clearly, the ability to control functionality plays an important part in the flexibility of the invention. For example, in preparing an A-B-A block copolymer by chemically linking pre-formed A and B blocks, providing a mono-functional A block assures that the final product is in fact the desired product. This is not possible where, for example, water exists in the reaction mixture. In such an environment, multi-functional A blocks may appear which result in A-A blocks or other undesirable poly-condensation products in the polymer product. This is clearly undesirable when a controlled A-B-A block copolymer is desired.

In summary, the method of the present invention teaches the following general steps:

a) obtaining a quantity of cyclic ether monomer having the formula:

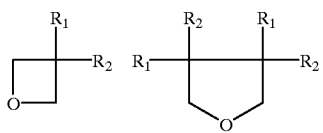

wherein the $R_1$, and $R_2$ group are the same or different and are selected from the group consisting of moieties having the formula $-(CH_2)_nX$, where n is an integer from 0 to 10 and X is selected from the group consisting of $-N_3$, $-H$, $-ONO_2$, $-Cl$, $-CN$, $-Br$, and $-O(alkyl)$ (wherein alkyl is $C_1$-$C_{16}$, branched or unbranched, cyclic or acyclic);

b) obtaining an effective quantity of a salt which is capable of acting as a co-catalyst of a polymerization reaction of said cyclic ether monomer such as a triethoxonium salt of the type described herein;

c) obtaining an effective quantity of an alcohol which is capable of acting as a co-catalyst of a polymerization reaction of said cyclic ether monomer;

d) combining said salt and said alcohol to form a polymerization catalyst mixture;

e) adding said cyclic ether to the mixture of said salt and said alcohol in a non-polar solvent and allowing polymerization of said cyclic ether to occur and allowing said salt to scavenge trace water contained within said mixture.

The process of the invention results in effective polymerization of energetic cyclic ethers. The reaction is significantly faster than those achieved by conventional methods. The functionality of the resulting polymer is precisely controlled and it is possible to effectively polymerize energetic cyclic ether monomers. Thus, several of the significant problems encountered in existing systems are overcome.

EXAMPLES

The following examples are given to illustrate various embodiments which have been made or may be made in accordance with the present invention. These examples are given by way of example only, and it is to be understood that the following examples are not comprehensive or exhaustive of the many types of embodiments of the present invention which can be prepared in accordance with the present invention.

Example 1

In this example, a polymer was synthesized according to the teachings of the present invention. The alcohol initiator was butanediol (BDO) and the alkylating salt was triethoxonium hexafluorophosphate. The polymerization took place in a solution of methylene chloride. The mole ratio of salt to alcohol functional groups in the reaction mixture was 0.10.

A substituted oxetane of the type described above was employed as the monomer. The oxetane used is referred to as AMMO, where $R_1$, comprises $-CH_2N_3$ and $R_2$ comprises $-CH_2H$. The molarity of the monomer in the inert solvent was 3.0. The monomer was polymerized in the solution described above to form a homopolymer. The polymer formed was isolated and characterized by known techniques.

The following table sets forth the reagents and related information where FW is formula weight, and d is density:

| Cmpd | FW | moles | grains | ml. | d |
|------|------|------------|--------|------|-------|
| AMMO | 127 | 0.07874 | 40 | 9.19 | 1.088 |
| BDO | 90.12 | 0.00073143 | 0.0644 | 0.063 | 1.017 |
| Salt | 248.15 | 0.00014786 | 0.0354 | — | — |
| $MeCl_2$ | | | | 17.0 | |

Hydroxyl equivalent weight of the resulting polymer was 14,814.8. Gel permeation chromatography was used to further characterize the polymer. The applicable data is shown below where $M_n$ is mean molecular weight, $M_w$ is weight average molecular weight, and $M_w/M_n$ is the polydispersity index, or range of molecular weights.

| | |
|---|---|
| $M_n$ | 9,620 |
| $M_w$ | 23,300 |
| $M_w/M_n$ | 2.42 |

It was observed that the polymer formed had functionality and molecular weight well within desirable expected ranges. In addition, the polymerization reaction occurred easily and rapidly to form an energetic polymer product.

Example 2

In this example, a polymer was synthesized according to the teachings of the present invention. The alcohol initiator was benzyl alcohol and the alkylating salt was triethoxonium hexafluorophosphate. The polymerization took place in a solution of methylene chloride. The mole ratio, in mole percent, of salt to alcohol in the reaction mixture was 0.17.

A substituted oxetane of the type described above was employed as the monomer. The oxetane used is referred to as BAMO, where $R_1$, and $R_2$ both comprise —$CH_2N_3$. The molarity of the monomer in the solvent was 3.0. The solution was refluxed for 1 minute and then cooled to room temperature. As a result, the monomer was polymerized and the polymer formed was isolated and characterized by known techniques. The following table sets forth the reagents and related information where FW is formula weight, and d is density:

| Cmpd | FW | moles | grains | ml. | d |
|------|--------|-----------|--------|-------|--------|
| BAMO | 168 | 0.05952 | 10 | 8.08 | 1.2375 |
| Alcohol | 108.14 | 0.001429 | 0.154 | 0.148 | 1.045 |
| Salt | 248.15 | 0.0002381 | 0.059 | — | — |
| $MeCl_2$ | | | | 11.47 | |

Gel permeation chromatography was used to further characterize the polymer. The applicable data is shown below where $M_n$ is mean molecular weight, $M_w$ is weight average molecular weight, and $M_w/M_n$ is the polydispersity index, or range of molecular weights.

| | |
|---|---|
| $M_n$ | 5,380 |
| $M_w$ | 11,400 |
| $M_w/M_n$ | 2.12 |

It was observed that the polymer formed had functionality and molecular weight well within desirable expected ranges. In addition, the polymerization reaction occurred easily and rapidly to form an energetic polymer product.

Example 3

In this example, a polymer was synthesized according to the teachings of the present invention. The alcohol initiator was benzyl alcohol and the alkylating salt was triethoxonium hexafluorophosphate. The polymerization took place as a solution of methylene chloride. The mole ratio of salt to alcohol in the reaction mixture was 0.20.

A substituted oxetane of the type described above was employed as the monomer. The oxetane used is referred to as BEMO, where $R_1$, and $R_2$ both comprise —$CH_2OEt$. The molarity of the monomer was 2.0. The solution was refluxed for 1 minute and then cooled to room temperature. As a result, the monomer was polymerized and the polymer formed was isolated and characterized by known techniques.

The following table sets forth the reagents and related information where FW is formula weight, and d is density:

| Cmpd | FW | moles | grams | ml. | d |
|------|--------|-----------|-------|-------|-------|
| BEMO | 174 | 0.02874 | 5 | 5.24 | 0.955 |
| Alcohol | 108.14 | 0.001437 | 0.155 | 0.149 | 1.045 |
| Salt | 248.15 | 0.0002874 | 0.071 | — | — |
| $MeCl_2$ | | | | 9.13 | |

Molecular weight of the polymer was discovered to be approximately 7550.

It was observed that the polymer formed had functionality and molecular weight well within desirable expected ranges. In addition, the polymerization reaction occurred easily and rapidly to form an energetic polymer product.

Gel permeation chromatography was used to further characterize the polymer. The applicable data is shown below where $M_n$ is mean molecular weight, $M_w$ is weight average molecular weight, and $M_w/M_n$ is the polydispersity index, or range of molecular weights.

| | |
|---|---|
| $M_n$ | 5,370 |
| $M_w$ | 11,200 |
| $M_w/M_n$ | 2.09 |

Example 4

In this example, a block copolymer was synthesized according to the teachings of the present invention. The alcohol initiator was benzyl alcohol and the alkylating salt was triethoxonium hexafluorophosphate. The polymerization took place as a solution of methylene chloride. The mole ratio of salt to alcohol in the reaction mixture was 0.20.

A pair of substituted oxetanes of the type described above were employed as the monomers. One of the oxetanes was BEMO as described above and the other oxetane was dimethyl oxetane. The molarity of the monomers in the solvent was 2.0. The following table sets forth the reagents and related information where FW is formula weight, and d is density:

| Cmpd | FW | moles | grams | ml. | d |
|---|---|---|---|---|---|
| BEMO | 174 | 0.02874 | 5 | 5.24 | 0.955 |
| Alcohol | 108.14 | 0.001437 | 0.155 | 0.149 | 1.045 |
| Salt | 248.15 | 0.0002874 | 0.071 | — | — |
| MeCl$_2$ | | | | 9.13 | |
| DMO | 86.13 | 0.00874 | 2.48 | 2.97 | 0.835 |

In a 50 ml 2-neck round bottom flask with stir bar and condenser, 0.071 g of the salt was added followed by 9.13 mls of MeCl$_2$. The solution was stirred and then benzyl alcohol was added. The reaction refluxed vigorously. Thirty seconds after reflux DMO was added and the reaction refluxed. After reflux NMR was taken and the polymerization was completed.

Example 5

In this example, a sequential polymer synthesis was completed according to the teachings of the present invention. The polymerization resulted in an A-B-A block copolymer. The alcohol initiator was butane diol (BDO) and the alkylating salts were triethoxonium hexafluorophosphate and triethoxonium tetrafluoroborate. The polymerization took place as a solution of methylene chloride. The mole ratio of salt to alcohol functional groups in the reaction mixture was 0.20.

BAMO and AMMO, was defined above, were the substituted oxetane monomers. The molarity of the monomers in the solvent was 3.0.

The following table sets forth the reagents and related information where FW is formula weight, and d is density:

| Cmpd | FW | moles | grams | ml. | d |
|---|---|---|---|---|---|
| AMMO | 127 | 0.07874 | 10 | 9.19 | 1.088 |
| BDO | 90.12 | 0.000250 | 0.2253 | 0.022 | 1.017 |
| Et$_3$OPF$_6$ | 248.15 | 0.0001 | 0.0248 | — | — |
| MeCl$_2$ | | | | 17.06 | |
| BAMO | 168 | 0.02976 | 5.0 | 4.04 | 1.2375 |
| Et$_3$OBF$_4$ | 141.93 | 0.0001 | 0.0142 | 0.0123 | 1.154 |
| MeCl$_2$ | | | | 6.0 | |

AMMO was added to BDO and Et$_3$OPF$_6$ in MeCl$_2$ and refluxed for 1 hour, at which time 3 ml of the solution was removed. Then Et$_3$OBF$_3$ was added followed by BAMO. The mixture was stirred and refluxed until the polymerization was essentially complete.

It was observed that the polymer formed had functionality and molecular weight well within desirable expected ranges. In addition, the polymerization reaction occurred easily and rapidly to form an energetic block polymer product.

Example 6

In this example, a polymer was synthesized according to the teachings of the present invention. The alcohol initiator was trans 1,4 cyclohexane dimethanol (TCD) and the alkylating salt was triethoxonium hexafluorophosphate. The polymerization took place as a solution of methylene chloride. The mole ratio of salt to alcohol functional groups in the reaction mixture was 0.05.

AMMO was employed as the monomer. The monomer was polymerized in the solution described above to form a homopolymer. The polymer formed was isolated and characterized by known techniques.

The following table sets forth the reagents and related information where FW is formula weight, and d is density:

| Cmpd | FW | moles | grams | ml. | d |
|---|---|---|---|---|---|
| AMMO | 127 | 0.07874 | 10 | 9.19 | 1.088 |
| TCD | 144.21 | 0.00042 | 0.0605 | — | — |
| Salt | 248.15 | 0.000042 | 0.0104 | 0.21 | — |
| MeCl$_2$ | | | | 8.3 | |

The TCD was weighed in a 50 ml 2 neck round bottom flask. The MeCl$_2$ was added followed by the AMMO. The mixture was heated to reflux, then Et$_3$OPF$_6$ was added until reflux.

Gel permeation chromatography was used to further characterize the polymer. The applicable data is shown below where M is mean molecular weight, M$_w$, is weight average molecular weight, and M$_w$/M$_n$ is the polydispersity index, or range of molecular weights.

| | |
|---|---|
| M$_n$ | 14,700 |
| M$_w$ | 29,600 |
| M$_w$/M$_n$ | 2.01 |

It was observed that the polymer formed had functionality and molecular weight well within desirable expected ranges. In addition, the polymerization reaction occurred easily and rapidly to form an energetic polymer product.

Example 7

In this example, a polymer was synthesized according to the teachings of the present invention. The alcohol initiator was butane diol (BDO) and the alkylating salt was triethoxonium tetrafluoroborate. The polymerization took place as a solution of methylene chloride. The mole ratio of salt to alcohol functional groups in the reaction mixture was 0.125.

BAMO was employed as the monomer. BAMO was added to the alcohol/salt complex in methylene chloride and was heated to reflux until polymerization was complete. The polymer formed was isolated and characterized by known techniques.

The following table sets forth the reagents and related information where FW is formula weight, and d is density:

| Cmpd | FW | moles | grams | ml. | d |
|---|---|---|---|---|---|
| BAMO | 168 | 0.02976 | 5 | 4.04 | 1.2375 |
| BDO | 90.12 | 0.001 | 0.090 | 0.089 | 1.017 |
| Salt | 1 M solution | 0.00023 | — | 0.25 | — |
| MeCl$_2$ | — | — | — | 5.88 | — |

Gel permeation chromatography was used to further characterize the polymer. The applicable data is shown below where M$_n$ is mean molecular weight, M$_w$ is weight average molecular weight, and M$_w$/M$_n$ is the polydispersity index, or range of molecular weights.

| | |
|---|---|
| M$_n$ | 3.040 |
| M$_w$ | 5,340 |
| M$_w$/M$_n$ | 1.76 |

It was observed that the polymer formed had functionality and molecular weight well within desirable expected ranges. In addition, the polymerization reaction occurred easily and rapidly to form an energetic polymer product.

Example 8

In this example, a polymer was synthesized according to the teachings of the present invention. The alcohol initiator was butane diol (BDO) and the alkylating salt was triethoxonium tetrafluoroborate. The polymerization took place as a solution of methylene chloride. The mole ratio of salt to alcohol functional groups in the reaction mixture was 0.25.

NMMO was employed as the monomer. NMMO was added to the alcohol/salt complex in methylene chloride and was heated to reflux until polymerization was complete. The polymer formed was isolated and characterized by known techniques.

The following table sets forth the reagents and related information where FW is formula weight, and d is density:

| Cmpd | FW | moles | grams | ml. | d |
|---|---|---|---|---|---|
| NMMO | 147 | 0.03401 | 5 | 4.17 | 1.200 |
| BDO | 90.12 | 0.001667 | 0.015 | 0.0147 | 1.017 |
| Salt | 1 M sol'n | 0.00008335 | — | 0.083 | — |
| MeCl$_2$ | — | — | — | 7.2 | — |

Gel permeation chromatography was used to further characterize the polymer. The applicable data is shown below where $M_n$ is mean molecular weight, $M_W$ is weight average molecular weight, and $M_w/M_n$ is the polydispersity index, or range of molecular weights.

| | |
|---|---|
| $M_n$ | 8,090 |
| $M_w$ | 21,100 |
| $M_w/M_n$ | 2.61 |

It was observed that the polymer formed had functionality and molecular weight well within desirable expected ranges. In addition, the polymerization reaction occurred easily and rapidly to form an energetic polymer product.

Summary

Accordingly, methods and compositions are provided which overcome several of the limitations of the art. The present invention provides improved polymerization methods for polymerizing cyclic ethers, particularly cyclic ethers having 4 or 5 member rings. In the process of the present invention, polymerization of cyclic ethers is catalyzed by an alkylating salt as a co-catalyst which is much more effective than conventional techniques. The invention also uses an alcohol as a co-catalyst which forms an initiating species together with the salt. By using the present invention, it is possible to prepare polymers having controlled functionality and high molecular weights.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for rapidly producing an energetic cyclic ether polymer having controlled functionality and molecular weight, comprising the steps of:

obtaining a quantity of cyclic ether monomer having the formula:

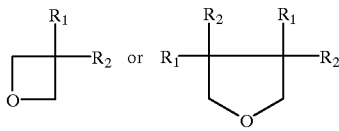

wherein the $R_1$ and $R_2$ groups are the same or different and are selected from the group consisting of moieties having the formula —(CH$_2$)$_n$X, where n is an integer from 0 to 10 and X is selected from the group consisting of —N$_3$, —H, —ONO$_2$, —Cl, —CN, —Br, and —O(alkyl), wherein alkyl is C$_1$–C$_{16}$, branched or unbranched, cyclic or acyclic;

obtaining a co-catalytically effective quantity of a triethoxonium salt which is capable of acting as a co-catalyst of a polymerization reaction of said cyclic ether monomer;

obtaining a co-catalytically effective quantity of an alcohol which is capable of acting as a co-catalyst of a polymerization reaction of said cyclic ether monomer;

combining said salt and said alcohol to form a polymerization catalyst mixture;

adding said cyclic ether to the mixture of said salt and said alcohol in a non-polar solvent and allowing polymerization of said cyclic ether to occur and allowing said salt to scavenge trace water contained within said mixture such that a polymer of controlled functionality is rapidly produced.

2. A method for producing an energetic cyclic ether polymer as defined in claim 1 wherein $R_1$ and $R_2$ are —CH$_2$N$_3$.

3. A method for producing an energetic cyclic ether polymer as defined in claim 1 wherein $R_1$ is —CH$_3$ and $R_2$ is —CH$_2$N$_3$.

4. A method for producing an energetic cyclic ether polymer as defined in claim 1 wherein $R_1$ is —CH$_2$ONO$_2$ and $R_2$ is —CH$_3$.

5. A method for producing an energetic cyclic ether polymer as defined in claim 1 wherein $R_1$ is —CH$_2$ONO$_2$ and $R_2$ is —CH$_2$N$_3$.

6. A method for producing an energetic cyclic ether polymer as defined in claim 1 wherein $R_1$ and $R_2$ are —CH$_2$ONO$_2$.

7. A method for producing an energetic cyclic ether polymer as defined in claim 1 wherein the anion of said triethoxonium salt is selected from the group consisting of hexafluorophosphate, hexachloroantimonate, and tetrafluoroborate.

8. A method for producing an energetic cyclic ether polymer as defined in claim 1 wherein said alcohol comprises a mono-functional alcohol and wherein said polymer is essentially mono-functional.

9. A method for producing an energetic cyclic ether polymer as defined in claim 1 wherein said alcohol comprises a di-functional alcohol and wherein said polymer is essentially di-functional.

10. A method for producing an energetic cyclic ether polymer as defined in claim 1 wherein said solvent comprises dichloromethane.

* * * * *